United States Patent [19]

Suh et al.

[11] 4,397,171
[45] Aug. 9, 1983

[54] METHOD FOR FORMING SPLINES IN SHEET METAL

[75] Inventors: Sang-Kee Suh, Daequ, Rep. of Korea; Gotz S. Hauser, Southfield; Harry T. Johnson, Dearborn, both of Mich.

[73] Assignee: Ford Motor Company, Dearborn, Mich.

[21] Appl. No.: 287,443

[22] Filed: Jul. 27, 1981

[51] Int. Cl.³ .............................................. B21D 22/00
[52] U.S. Cl. ........................................ 72/348; 72/370
[58] Field of Search ................. 72/347, 348, 354, 356, 72/370

[56] References Cited

U.S. PATENT DOCUMENTS

| | | | |
|---|---|---|---|
| 387,472 | 8/1888 | Weeden . | |
| 1,301,774 | 4/1919 | Wilson . | |
| 1,705,931 | 3/1929 | Lewis et al. | 29/159.2 |
| 2,072,308 | 3/1937 | Labin | 29/159.2 |
| 3,327,511 | 6/1967 | White | 72/348 |
| 3,796,106 | 3/1974 | Fisher | 74/243 R |
| 4,014,619 | 3/1977 | Good et al. | 403/359 |
| 4,089,097 | 5/1978 | Good | 72/362 |
| 4,131,032 | 12/1978 | Warland et al. | 29/159.2 |

*Primary Examiner*—Leon Gilden
*Attorney, Agent, or Firm*—D. J. Harrington; F. G. McKenzie

[57] ABSTRACT

A sheet metal blank is placed at the entrance of a die having a splined interior contour. A punch having a conjugate splined surface enters and passes longitudinally through the die. The splines are formed by passing the blank and punch through the die within an annular space whose contour defines the final spline configuration. Alternatively, preformed splines having a large pressure angle and full corner radii are reformed by multiple passes through dies whose configurations vary to produce shallow pressure angle splines and tight corner radii.

4 Claims, 6 Drawing Figures

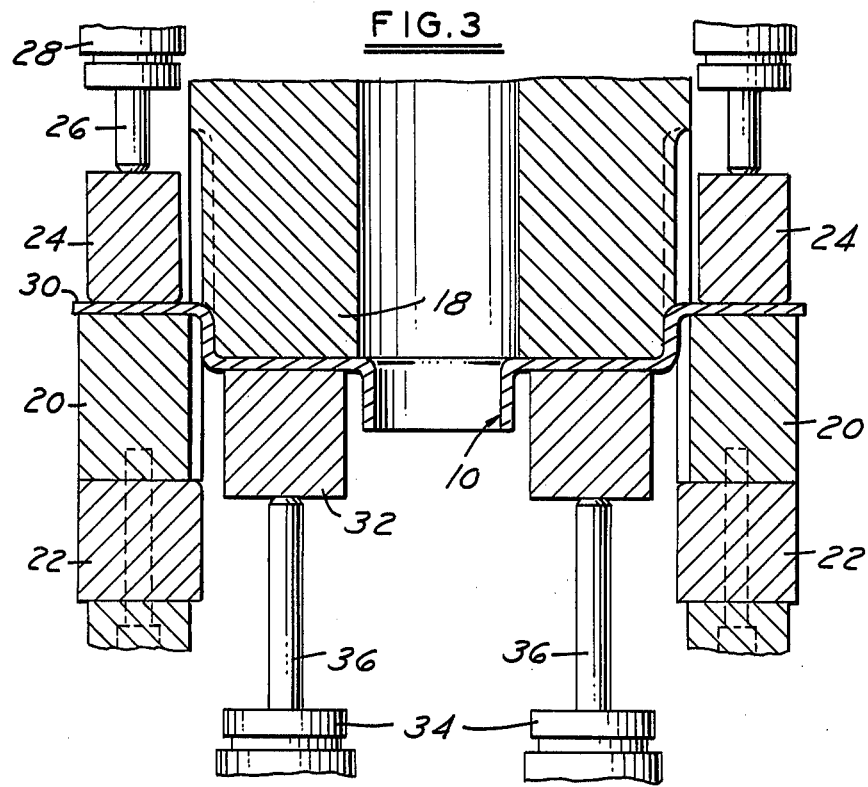
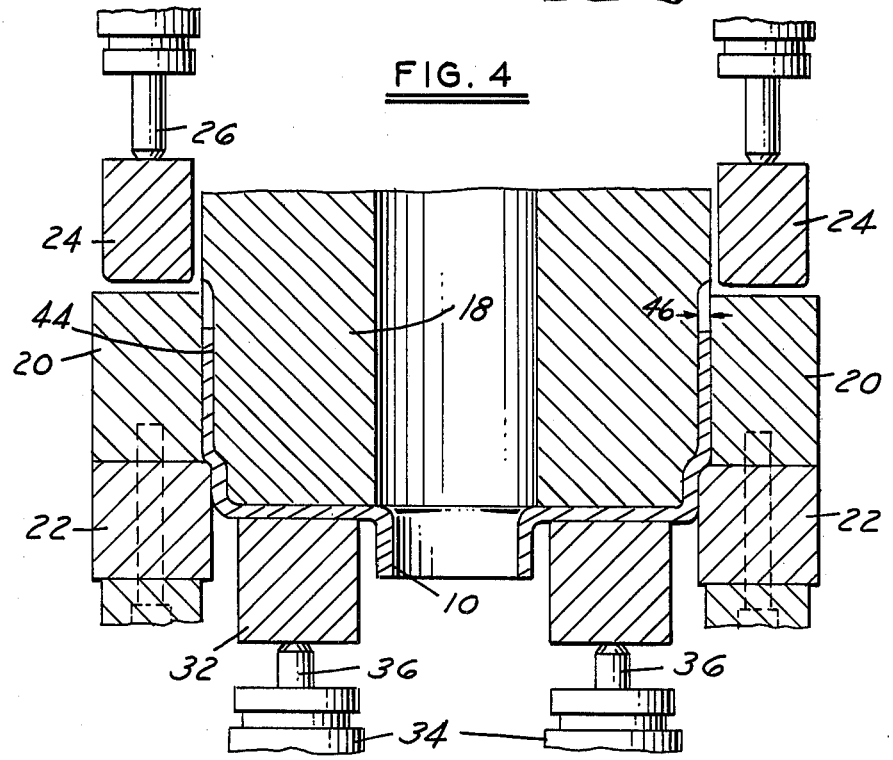

METHOD FOR FORMING SPLINES IN SHEET METAL

BACKGROUND OF THE INVENTION

1. Field of the Invention

This invention pertains to the field of forming splined surfaces particularly on sheet metal components and more particularly to producing splines having shallow pressure angles produced by successive passes through forming dies.

2. Description of the Prior Art

Currently automatic transmissions have heavy cast or forged clutch and brake cylinders formed with splines on their outer surfaces. The splines permit axial movement in a guided relationship upon being pressurized by the hydraulic system of the transmission. The clutch and brake cylinders have walls that are thick and strong enough so that internal and external splines can be machined on their cylindrical surfaces. Lighter weight clutch and brake cylinders for an automatic transmission could be made if the splines could be formed by cold working processes such as by drawing the spline contour on sheet metal cups. Accurately controlled spline contours must be produced by the process for use in an automatic transmission, however.

It is a requirement, particularly in automatic transmission applications of a sheet metal splined cylinder, that the pressure angle be kept low and the corner radii of the splines be fairly tight. In this way, reliable positive engagement between internal and external meshing splines can be assured. If the pressure angle is too shallow, the height of the splines must be made correspondingly greater in order to maintain the contact pressures produced by the torque being transmitted between the splines at an acceptable level. This is a particularly important problem when the splined surfaces are formed on sheet metal whose dimensional stability under the radial loads produced by the torque is considerably less than that of the conventional cast or forged clutch and brake cylinders.

SUMMARY OF THE INVENTION

The process for forming dimensionally precise external and internal splines on a preformed sheet metal cup according to this invention produces parts that are lightweight and dimensionally accurate. The sheet metal thicknesses, which are closely controlled, may vary at selected portions of the spline contour. Splines can be formed in high volume by a simple drawing operation that can be automated to minimize labor costs. It is a further object of this invention that the splines so formed be made without machining.

The method according to this invention forms longitudinal splines on the peripheral surface of a cup made from a sheet metal blank in the form of a circular disc. A die having a splined inner surface that is conjugate and complementary to the outer spline surface of a male punch is arranged to permit the sheet metal to be located in an annular space provided between the surfaces as the punch is moved within the die. In this way, the disc attains a generally cylindrical configuration having internal and external splines defined by the annular space provided between the contours of the punch and of the die. This annular space has a radial dimension that is less than the thickness of the sheet. Accordingly, the metal forming the circumferential length of the disk near its outer diameter that would otherwise exceed the circumferential length of the cylinder is displaced longitudinally to produce a somewhat increased length spline. The thickness of the cylinder can be closely controlled by the radial dimension of the annular space.

Another aspect of this invention provides for a sheet metal cylinder, whose spline contour has a shallow pressure angle and tight bend radii at the corners of the spline to be formed in a drawing operation that includes at least two passes. The first pass produces a subtle, perhaps sinusoidal spline contour. Next, the splines are reformed to have a smaller pressure angle and sharp corner radii by a second drawing pass through a second die. The cylinder upon which the first spline contour is formed by this process may originate either as a sheet metal disc or as a circular cylindrical cup. The major diameter of the splines formed by the first pass is greater than the major diameter formed by the subsequent pass through the second die, which reforms the original spline contours to the reduced pressure angle configuration.

BRIEF DESCRIPTION OF THE DRAWINGS

FIG. 3 is a partial cross sectional view showing a partially formed part located between an axial punch and a forming die.

FIG. 4 is a partial cross sectional view taken on a diametrical plane showing the sheet metal cup of FIG. 3 in position between the punch and the forming dies after the punch has been moved into the die to form the splines.

DESCRIPTION OF THE PREFERRED EMBODIMENTS

Figure 1:
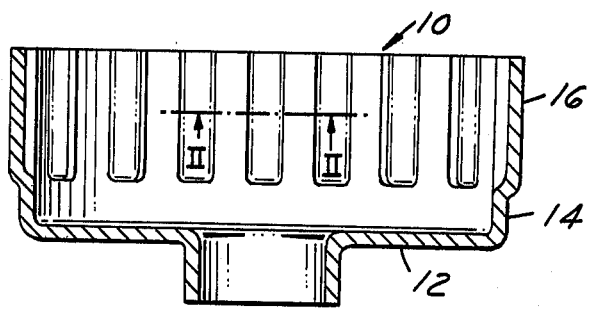
FIG. 1 is a cross section through a diametrical plane of a sheet metal cup formed with splines according to the principles of this invention.
Figure 2:
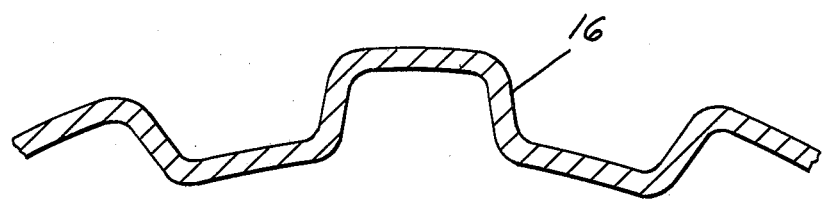
FIG. 2 is a partial cross section taken at axial plane II—II of the sheet metal cup of FIG. 1.

Referring first to FIGS. 1 and 2 of the drawing, a finished sheet metal cup 10 includes a hub portion 12 and an axial extending cylindrical portion 14 in which a spline contour has been formed. The splined cup may be a component of an automatic transmission clutch assembly. The pressure angle of the teeth may be about eighteen degrees. The corner radii are much tighter than those commonly formed by drawing. Because of these geometric changes, the pressure between the spline teeth and the mating part is less than would result from torque transfer between the parts if the pressure angle were greater.

FIGS. 3 and 4 illustrate the apparatus for forming the splines on the cup shown in FIGS. 1 and 2. The die assembly comprises a punch 18 connected to the movable member of a hydraulic press and a die 20 suitably secured to the fixed or table portion 22 of the press. A blank holder ring 24 is held by the stem 26 of hydraulic cylinder 28 against the upper surface of a planar sheet metal disk portion 30 of the preformed sheet metal cup 10. An additional blank holder ring 32 holds the sheet against the lower surface of the punch 18 due to the effect of hydraulic pressure applied to the cylinder 34 that moves cylinder stems 36.

The punch 18 is an elongated member having a spline surface formed on its outer contour. The die through which the punch passes has an inner surface conjugate to that of the punch that cooperates with the splined surface of the punch to form splines on the cup 10. The die may have the configuration shown in FIG. 6 that includes an inner cylindrical surface 38, a transition zone 40 and the splined surface 42 that is complementary to the splines of the punch. An alternate die may be made as shown in FIGS. 3 and 4.

Initially the cylindrical surface 14 of the cup is located between the diameter at the base of the punch and the inner diameter of the cylindrical surface 38 of the die. As the press moves the punch through the die, the splines begin to be formed in the transition zone 40 wherein the tooth surfaces appear gradually on the die radially and circumferentially. Finally, when the press has forced the punch and cup through the die, the splines are entirely formed on the cup and the disk portion of the cup has been transformed to the cylindrical longitudinally splined surface 44 shown in FIG. 4.

The diameters of the splined surfaces of the punch and die are established so that an annular space 46 exists bounded by the outer surface of the punch and the inner surface of the splines on the die. Space 46 has a radial dimension that is less than the original thickness of the sheet from which the cup is made. Consequently, when the splines are formed the excess sheet material thickness is moved along the length of the longitudinal portion of the cup in the direction of the axis of the spline. In addition, because the splines are formed on the portion of the cup that was originally a disk and is drawn to a lesser diameter than the outer diameter of the disk, the excess material that would appear at the circumference of the longitudinal splines is forced axially along the axis of the cup in the direction of the splines.

Figure 6:
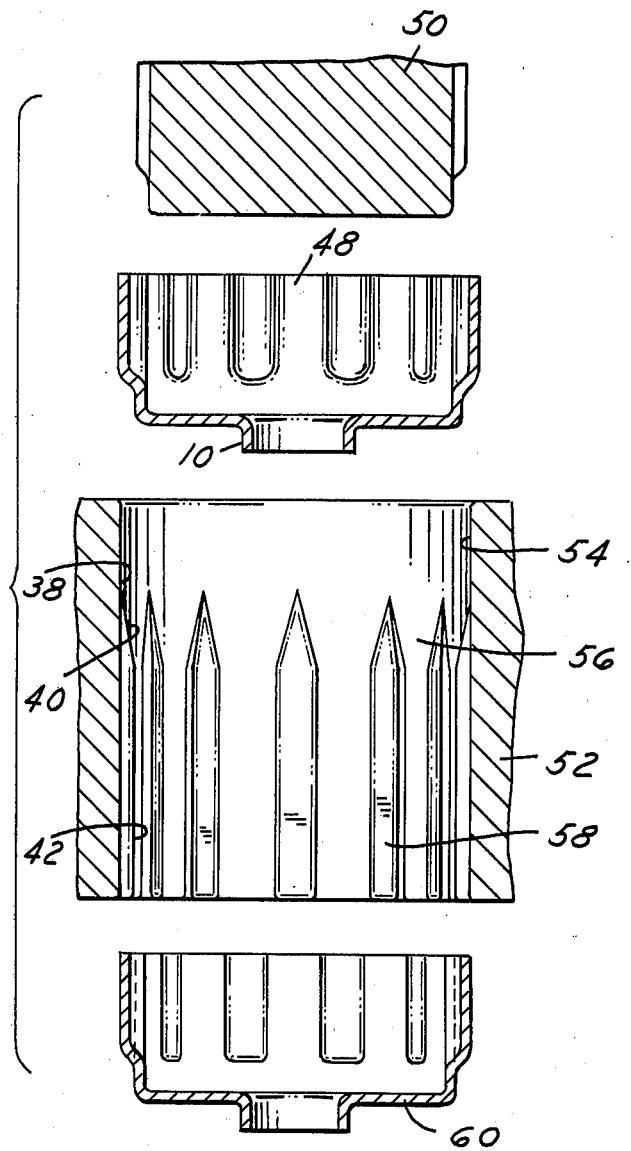
FIG. 6 is a cross section through a diametrical plane showing a punch, die and a sheet metal cup after the first stage and final stage forming processes, the contours of which are shown in FIG. 5.

The process for forming the splines may be worked in stages. FIG. 6 shows a sheet metal cup 48 after having been formed with splines whose profile is more subtle than the trapezoidally shaped teeth shown in FIG. 2. For example, a sinusoidally shaped tooth profile may be formed by the process that produces the preformed cup 48. The preferred tooth shape shown in FIG. 2, one having a pressure angle of approximately eighteen degrees with sharp corner radii, may be formed on cup 48 after at least one additional pass of a punch through a second die 52. The second pass begins when the major diameter of the teeth of cup 48 contacts the cylindrical surface 54 of the die 52. The splines on the outer surface of the punch 50 have the preferred shallow pressure angle and are nested within the splines on the preformed cup 48. As the press moves the punch and cup longitudinally into the inner space of die 52, the transition region 56 operates to reform the sinusoidal splines radially and circumferentially. When the punch 50 and cup 48 have passed into the forming region 42 of the die 52 the teeth are formed to the preferred shape of FIG. 2 on the forming surface 58.

Again, an annular space 46 is provided between the outside surface of punch 50 and the inner surface of the forming region 42 of the die. The space 46 has a radial dimension somewhat less than the thickness of the preformed cup 48 so that the final thickness of the cup in the condition shown in FIG. 6 at 60 is closely controlled within a minimum tolerance.

Figure 5:
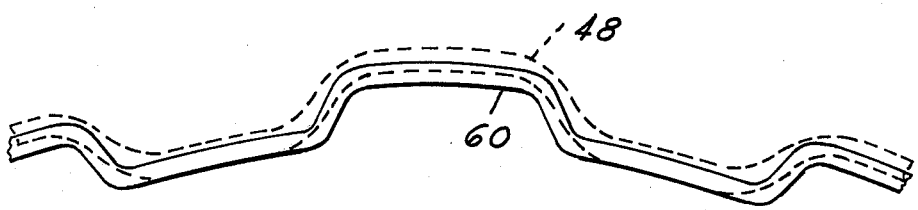
FIG. 5 is a partial cross section taken on an axial plane similar to II—II of FIG. 1 showing the contour of a spline formed on a sheet metal cup after a first stage and a final stage forming process, the first stage producing a more subtle contour at a larger diameter than the final contour.

The process for forming the splines on the cup includes at least two passes through forming dies. According to this method, the spline profiles are produced on the cups in two passes that produce the profile shown in FIG. 5. The spline surfaces of the preformed cup 48 are shown in FIG. 5 having a major diameter greater than the major diameter of the final tooth profile shown at 60. It can be seen that the pressure angle of the spline 48 formed on the cup is greater than the pressure angle of the splines 60 and that the corner radii are more generous than those of the final configuration. Preferably, the inside diameter of the cup formed by the first pass and of the splines 60 formed by the second pass are identical, as can be seen in FIG. 5. Furthermore, the thickness of the sheet metal in the region of the crest of the spline can be made different from the thickness of the sheet at the root of the spline. This results because the splined surfaces of the punch 50 and die 52 are established so that the annular space 46 between inner surface of the punch and the outer surface of the die that form the crest of the spline and between the outer surface of the punch and the inner surface of the die that form the root of the spline has a radial dimension that differs between the crest and root areas. Furthermore, the radial dimension of space 46 is less than the sheet thickness of the preformed cup 48. In this way, the final thickness of the sheet can be controlled within a close tolerance to the varying radial dimension of the space.

It is possible that all of the forming operations from which a sheet metal blank is formed to the preferred shapes of FIGS. 2 and 5 may be made on one press during one stroke of the punch through several dies. This process would first draw the sheet metal blank into the form of a cup without splines similar to that shown in FIG. 1 with the use of perhaps five dies. The spline drawing operation would require perhaps two later passes through forming dies similar to dies 52 or 18, and would produce the preferred spline contours in stages by the process described with respect to FIGS. 5 and 6.

Having described the preferred embodiments of our invention what we claim and desire to secure by the U.S. Letters Patent is:

1. A method of making a longitudinally splined annular member comprising:
   forming a blank having a circular cylindrical wall extending longitudinally;
   forming a first set of longitudinal splines on the cylindrical wall having a first major diameter;
   reforming the first set of splines to produce a second set of longitudinal splines having a greater pressure angle than the first set and a second major diameter smaller than the first major diameter,
   the forming and reforming steps comprising passing a single punch having a splined surface formed on its outer surface longitudinally within a die having a splined surface that is conjugate to the outer surface of the punch formed on its inner surface, the outer surface of the punch and inner surface of the die providing a annular space therebetween whereby the cylindrical wall is formed with longitudinal splines upon being forced to conform to the shape of the spaced as the punch passes within the die.

2. A method for forming a splined surface on a member comprising:
   forming a flat, circular disc blank from sheet metal;

aligning the axis of a punch having a splined surface formed on its outer surface with the axis of a die having a splined surface conjugate to the outer surface of the punch formed on its inner surface, the outer surface of the punch and the inner surface of the die providing an annular space therebetween having a dimension that is less than the thickness of the blank;

locating the blank between the punch and the die;

drawing the punch within the die so that the blank is forced into the annular space therebetween; and coining the formed member by passing the punch at least partially through the die so that the material of the member is moved longitudinally and radially, whereby the thickness of the formed member is determined by the dimensions of the annular space.

3. The method of claim 2 wherein the coining step produces a thickness of the splines of the formed member that is less than the original thickness of the blank.

4. The method of claim 2 wherein the drawing step forms the spline with a pressure angle that increases with the distance that the punch and blank move within the die.

* * * * *